United States Patent [19]

Kim

[11] Patent Number: 5,448,373
[45] Date of Patent: Sep. 5, 1995

[54] METHOD FOR SUCCESSIVELY REPRODUCING VIDEO SIGNALS FROM BOTH SIDES OF VIDEO DISK IN VIDEO DISK PLAYERS

[75] Inventor: Byung J. Kim, Seoul, Rep. of Korea

[73] Assignee: Goldstar Co., Ltd., Seoul, Rep. of Korea

[21] Appl. No.: 153,896

[22] Filed: Nov. 17, 1993

[30] Foreign Application Priority Data

Nov. 17, 1992 [KR] Rep. of Korea .............. 1992-21580

[51] Int. Cl.⁶ .................. H04N 5/781; H04N 5/93
[52] U.S. Cl. ................................. 358/342; 358/335
[58] Field of Search ............ 358/342, 335; 369/32, 369/199; H04N 5/781

[56] References Cited

U.S. PATENT DOCUMENTS

| | | | |
|---|---|---|---|
| 4,706,117 | 11/1987 | Schoolman | 358/342 |
| 5,006,939 | 4/1991 | Cawley | 358/341 |
| 5,136,395 | 8/1992 | Ishii et al. | 358/335 |
| 5,257,111 | 10/1993 | Kakuyama | 358/342 |

Primary Examiner—Howard W. Britton
Assistant Examiner—Huy Nguyen

[57] ABSTRACT

A method for successively reproducing video signals from both sides of a video disk in a video disk player. A spindle motor is driven to rotate the video disk. A first reproduction pickup reads the video signals recorded on a first side of the video disk moving from an inner circumference to an outer circumference of the first side of the video disk and a second reproduction pickup reads the video signals recorded on the second side of the video disk moving form an outer circumference to an inner circumference of the other side of the video disk and jumping a predetermined number of tracks to the outer circumference of the second side of the video disk every one rotation of the video disk during the movement. The read video signals from the first and second reproduction pickups are stored in a video memory unit. The stored video signals from the first side of the video disk are output from the video memory unit in their storage order to a screen and the stored video signals from the second side of the video disk are then output from the video memory unit in an opposite order from their storage order to the screen.

1 Claim, 3 Drawing Sheets

METHOD FOR SUCCESSIVELY REPRODUCING VIDEO SIGNALS FROM BOTH SIDES OF VIDEO DISK IN VIDEO DISK PLAYERS

BACKGROUND OF THE INVENTION

1. Field of the Invention

The present invention relates in general to video disk players, and ore particularly to for successively reproducing video signals from both sides of a video disk in a video disk player in which the video signals from both the sides of the video disk are read and stored and the stored video signals from one side of the video disk are output in an opposite order from their storage order after the video signals from the other side are output in their storage order, so that the video signals from both the sides of the video disk can be successively reproduced with no discontinuity.

2. Description of the Prior Art

Generally, in a video disk player, one or two pickups are employed to read video signals from a double-sided video disk with upper and lower sides on which the video signals were recorded, respectively.

FIG. 1 illustrates a conventional apparatus for successively reproducing the video signals from both the sides of the video disk in the video disk player employing a single pickup. In this drawing, the video disk is designated by the reference numeral 2 and the pickup is designated by the reference numeral 3.

As shown in FIG. 1, the conventional reproduction apparatus employing the single pickup 3 comprises a spindle motor 1 being driven to rotate the video disk 2. The pickup 3 is adapted to read the video signals recorded on both the sides of the video disk 2.

In operation, the disk 2 is rotated with rotation of the spindle motor 1. As rotated, the video signals recorded on both the sides of the video disk 2 are read by the pickup 3. At this time, the video signals on the upper and lower sides of the video disk 2 are read in the opposite direction to each other since they were recorded in the same direction.

Namely, the video disk 2 is rotated in a counter-clockwise direction S1 to allow the pickup 3 to read the video signals recorded on the lower side of the video disk 2. Also, the video disk 2 is rotated in a clockwise direction S2 to allow the pickup 3 to read the video signals recorded on the upper side of the video disk 2.

If the video disk 2 begins to be rotted by the spindle motor 1, the pickup 3 first reds the video signals from a position A (inner circumference) to a position B (outer circumference) of the lower side of the video disk 2 and is then turned to move to a position E (inner circumference) of the upper side of the video disk 2. After moving to the position E of the upper side of the video disk 2, the pickup 3 reads the video signals from that position E to a position D (outer circumference) of the upper side of the video disk 2. As a result of the reading to the point D of the upper side of the video disk 2, the reproduction of the video signals from the video disk 2 is completed.

In other words, the video signals recorded from the position A to the position B of the lower side of the video disk 2 are read by the pickup 3 while the video disk 2 is rotated in the counter-clockwise direction S1. Also, the video signals recorded from the position E to the position D of the upper side of the video disk 2 are read by the pickup 3 while the video disk 2 is rotated in the clockwise direction S2.

However, in the conventional reproduction apparatus employing a single pickup, the reproduction of the video signals is stopped while the pickup moves from the outer circumference of the lower side of the video disk to the inner circumference of the upper side of the video disk to read the video signals recorded on the upper side of the video disk after reading all the video signals recorded on the lower side of the video disk. As a result, a video picture is stopped on a screen for about 10–15 sec.

FIG. 2 illustrates a conventional apparatus for successively reproducing the video signals from both the sides of the video disk in the video disk player employing two pickups. In this drawing, the reference numerals 1 and 2 designate the spindle motor and the video disk, respectively, similar to those in FIG. 1. Also, the reference numerals 3 and 4 designate the two pickups or lower and upper side reproduction pickups, respectively.

In operation, the video disk 2 is rotated in the counter-clockwise direction S1 as the spindle motor 1 is rotated in the same direction. At this time, the lower side reproduction pickup 3 reads the video signals recorded on the lower side of the video disk 2, moving from a position G to a position G' of the lower side of the video disk 2.

Then, if the video disk 2 is rotated in the clockwise direction S2 as the spindle motor 1 is rotated in the same direction, the upper side reproduction pickup 4 reads the video signals recorded on the upper side of the video disk 2, moving from a position F to a position F' of the upper side of the video disk 2.

However, in the conventional reproduction apparatus employing two pickups, it takes about 4–6 sec to turn the rotation of the video disk from the counter-clockwise direction to the clock wise direction for the successive reproduction of the video signals. As a result, the reproduction of the video signals is stopped for that time period. Namely, the video picture is stopped on the screen for about 4–6 sec.

In summary, a conventional reproduction apparatus employing the single pickup has the disadvantage that the reproduction of the video signals is stopped while the pickup moves from the outer circumference of the lower side of the video disk to the inner circumference of the upper side of the video disk to read the video signals recorded on the upper side of the video disk after reading all the video signals recorded on the lower side of the video disk. Also, a conventional reproduction apparatus employing two pickups has the disadvantage that the reproduction of the video signals is stopped during turning the rotation of the video disk from the counter-clockwise direction to the clock wise direction for the successive reproduction of the video signals.

SUMMARY OF THE INVENTION

Therefore, the present invention has been made in view of the above problems, and it is an object of the present invention to provide a method for successively reproduction video signals from both sides of a video disk in a video disk player in which the video signals from both sides of the video disk are read and stored and the stored video signals from one side of the video disk are output in an opposite order from their storage order after the video signals from the other side are output in their storage order, so that the video signals from both the sides of the video disk can be successively reproduced with no discontinuity, due to a unidirectional rotation of the video disk and no movement of a pickup.

In accordance with one aspect of the present invention, there is provided a method of successively reproducing video signals from both sides of a video disk in a video disk player, comprising the steps of (a) driving a spindle motor to rotate the video disk; (b) reading the video signals recorded on one side of the video disk moving from an inner circumference to an outer circumference of the one side of the video disk and reading the video signals recorded on the other side of the video disk moving from an outer circumference to an inner circumference of the other side of the video disk; (c) storing the video signals read at said step (b); and (d) outputting the video signals from the one side of the video disk stored at said step (c) in the stored order to a screen and then outputting the video signals from the other side of the video disk stored at said step (c) in the opposite order to the storage to the screen.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
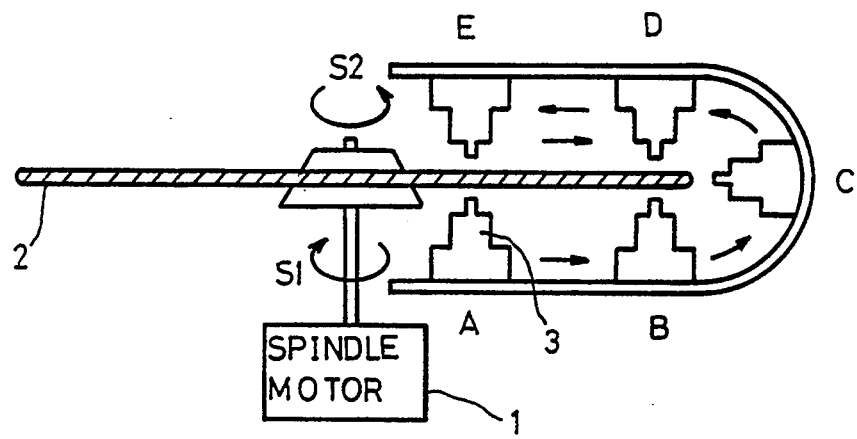
FIG. 1 illustrates a conventional apparatus for reproducing successively reproducing video signals from both sides of a video disk in a video disk player employing a single pickup.
Figure 2:
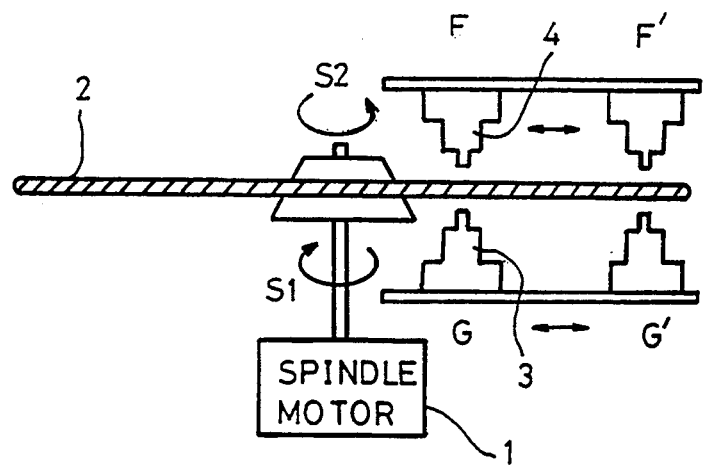
FIG. 2 illustrates a conventional apparatus for reproducing successively video signals from both sides of a video disk in a video disk player employing two pickups.
Figure 3:
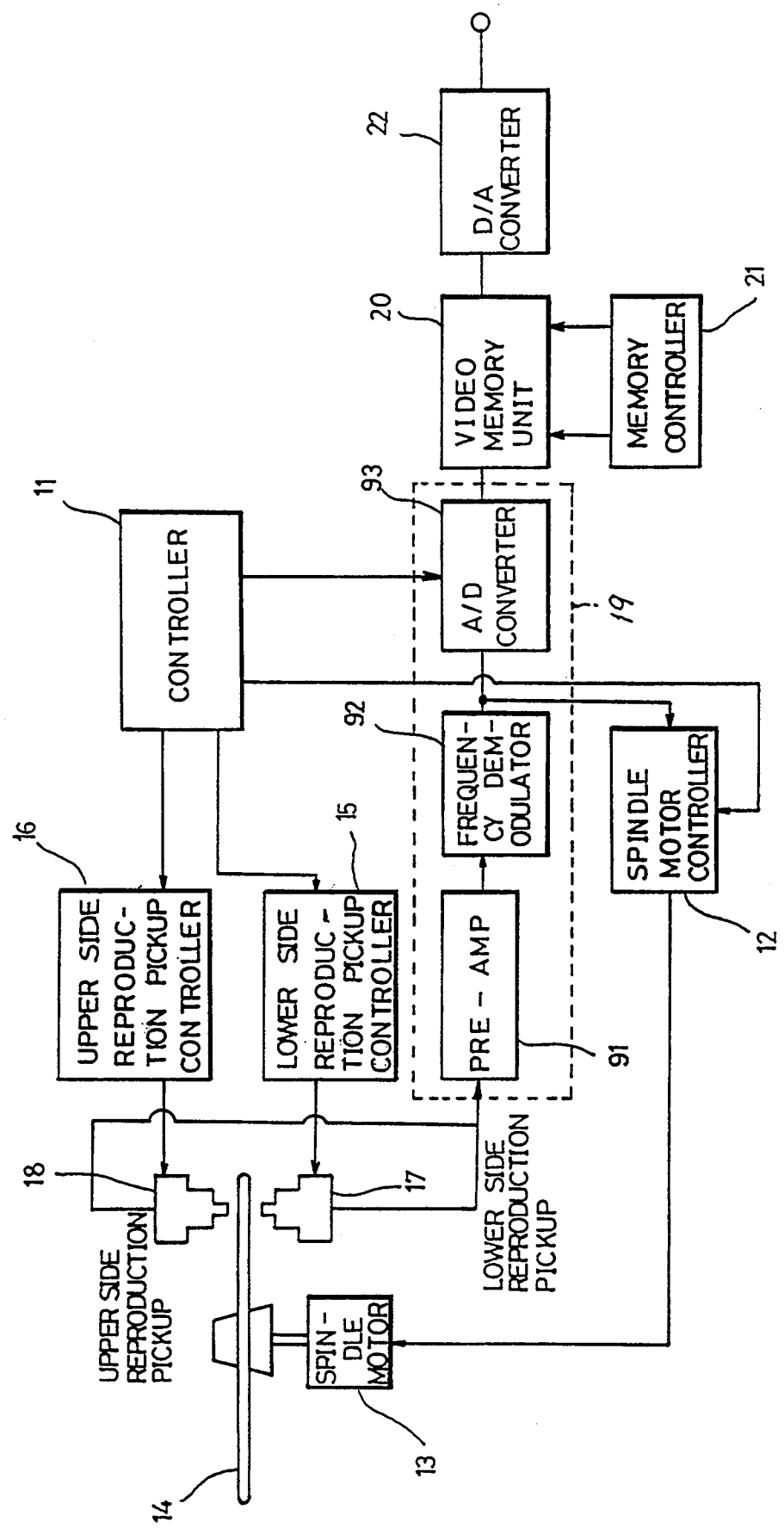
FIG. 3 is a block diagram of an apparatus for successively reproducing video signals from both sides of a video disk in a video disk player in accordance with the present invention.

FIG. 3 is a block diagram of an apparatus for successively reproducing video signals from both sides of a video disk in a video disk player in accordance with the present invention. In this drawing, the video disk is designated by the reference numeral 14.

As shown in FIG. 3, the reproduction apparatus of the present invention comprises a system controller 11 for controlling the operation of the apparatus and a spindle motor controller 12 for controlling a spindle motor 13 under the control of the system controller 11. The spindle motor 13 is driven under the control of the spindle motor controller 12 to rotate the video disk 14, on which the video signals are recorded, at a fixed velocity.

A lower side reproduction pickup controller 15 is provided in the reproduction apparatus to control a lower side reproduction pickup 17 under the control of the system controller 11. The lower side reproduction pickup 17 reads the video signals recorded on the lower side of the video disk 14, moving from an inner circumference to an outer circumference of the lower side of the video disk 14 under the control of the lower side reproduction pickup controller 15.

An upper side reproduction pickup controller 16 is also provided in the reproduction apparatus to control an upper side reproduction pickup 18 under the control of the system controller 11. The upper side reproduction pickup 18 reads the video signals recorded on the upper side of the video disk 14, moving from an outer circumference to an inner circumference of the upper side of the video disk 14 and jumping a predetermined number of tracks to the outer circumference of the upper side of the video disk 14 every one rotation of the video disk 14 during the movement under the control of the upper side reproduction pickup controller 16.

A video signal processing circuit 19 is also provided in the reproduction apparatus to amplify the read video signals from the lower and upper side reproduction pickups 17 and 18 by a predetermined level, frequency-demodulate the amplified video signals into composite video signals and convert the composite video signals into digital composite video signals.

The reproduction apparatus also comprises a video memory unit 20 for storing the digital composite video signals from the video signal processing circuit 19, a memory controller 21 for controlling the video memory unit 20 such that the digital composite video signals corresponding to the video signals read from the upper side of the video disk 14 are output from the video memory unit 20 in an opposite order from their storage order after the digital composite video signals corresponding to the video signals read from the lower side of the video disk 14 are output from the video memory unit 20 in their storage order, and a digital/analog (D/A) converter 22 for converting the digital composite video signals from the video memory unit 20 into analog composite video signals.

The video signal processing circuit 19 includes a pre-amplifier 91 for amplifying the read video signals from the lower and upper side reproduction pickups 17 and 18 by the predetermined level, a frequency-demodulator 92 for frequency-demodulating the amplified video signals from the pre-amplifier 91 into the composite video signals, and an analog/digital (A/D) converter 93 for converting the composite video signals from the frequency-demodulator 92 into the digital composite video signals in response to a predetermined clock from the system controller 11.

The operation of the reproduction apparatus with the above-mentioned construction in accordance with the present invention will hereinafter be described in detail with reference to FIGS. 3 to 5.

Figure 4:
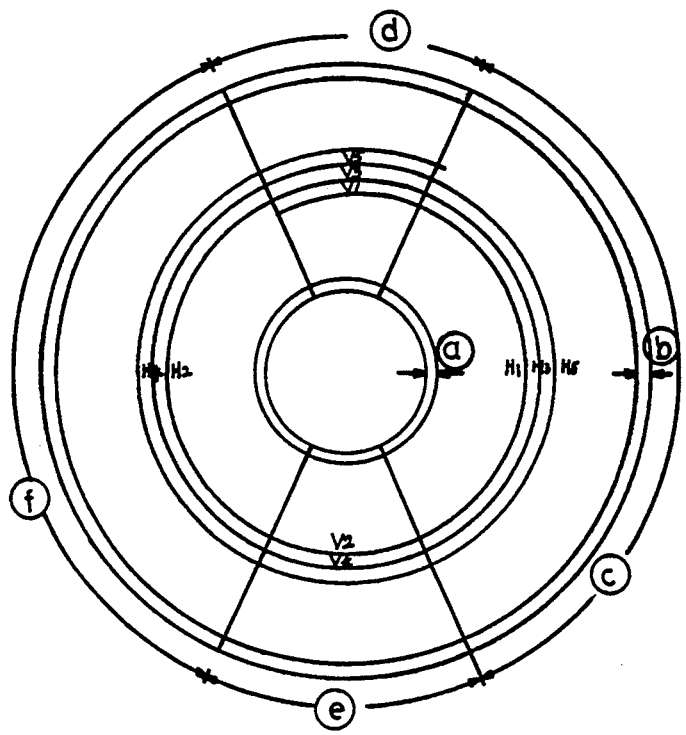
FIG. 4 illustrates a video disk of a constant angular velocity (CAV) type which is applied to the present invention.
Figure 5:
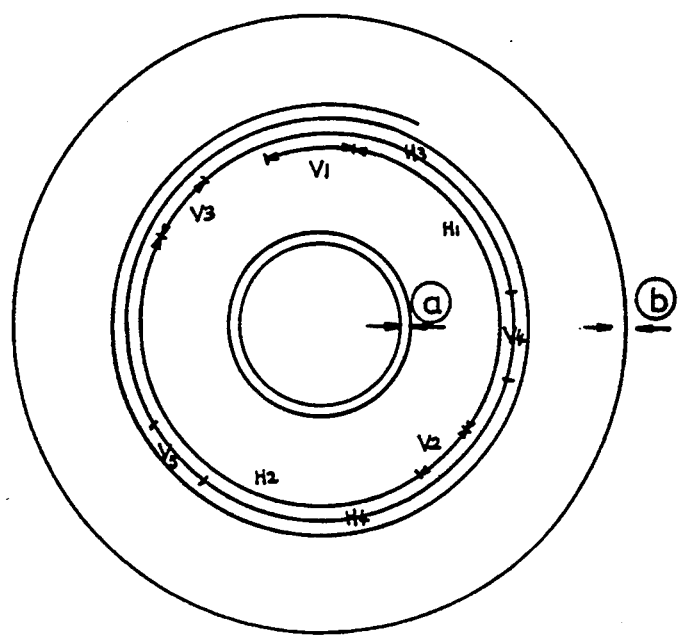
FIG. 5 illustrates a video disk of a constant linear velocity (CLV) type which is applied to the present invention.

Generally the video disk player uses one of two types of video disks a constant angular velocity (CAV) type as shown in FIG. 4 and a constant linear velocity (CLV) type as shown in FIG. 5. Also, the video signals from the lower side of the video disk 14 are read before those from the upper side thereof. First, the operation of the reproduction apparatus will be described with respect to the case where the video disk 14 is of the CAV type as shown in FIG. 4.

As shown in FIG. 4, each of the lower and upper sides of the video disk 14 of the CAV type has a pair of regions d and e on which vertical synchronous signals are placed at an interval of one rotation of the video disk 14 and a pair of regions c and f on which the video signals are placed at the interval of one rotation of the video disk 14. The regions d and e and the regions c and f are disposed at a desired angle about a rotational axis of the video disk 14.

In operation, the spindle motor controller 12 outputs horizontal synchronous signals contained in the video signals and a frequency generation signal to the spindle motor 13 under the control of the system controller 11. The frequency generation signal is generated to control the rotational velocity of the video disk 14. In response to the frequency generation signal from the spindle motor controller 12, the spindle motor 13 is driven, thereby causing the video disk 14 to be rotated.

As the video disk 14 is rotated, the lower and upper side reproduction pickup controllers 15 and 16 control the lower and upper side reproduction pickups 17 and 18 under the control of the system controller 11. The lower side reproduction pickup 17 reads the video signals recorded on the lower side of the video disk 14 under the control of the lower side reproduction pickup controller 15 and the upper side reproduction pickup 18 reads the video signals recorded on the upper side of the video disk 14 under the control of the upper side reproduction pickup controller 16.

At this time, the lower side reproduction pickup 17 reads the video signals recorded on the lower side of the video disk 14, moving from the inner circumference to the outer circumference of the lower side of the video disk 14. The upper side reproduction pickup 18 reads the video signals recorded on the upper side of the video disk 14 in an opposite order to their recording order, moving from the outer circumference to the inner circumference of the upper side of the video disk 14.

As the video disk 14 is rotated in a counter-clockwise direction for the reproduction of the video signals recorded on the lower side of the video disk 14, the upper side reproduction pickup 18 moves gradually to the inner circumference of the upper side of the video disk 14. For this reason, the upper side reproduction pickup controller 16 outputs such a control signal that the upper side reproduction pickup 18 jumps two tracks to the outer circumference of the upper side of the video disk 14 every one rotation of the video disk 14 during the movement. The two track jump of the upper side reproduction pickup 18 results in a one track movement thereof to the outer circumference every one rotation of the video disk 14. This result is the same as the rotation of the video disk 14 in a clockwise direction.

Then, in the video signal processing circuit 19, the pre-amplifier 91 amplifies the read video signals from the lower and upper side reproduction pickups 17 and 18 by the predetermined level. The frequency-demodulator 92 frequency-demodulates the amplified video signals from the pre-amplifier 91 into the composite video signals. The A/D converter 93 converts the composite video signals from the frequency-demodulator 92 into the digital composite video signals in response to the predetermined clock from the controller 11.

The digital composite video signals from the A/D converter 93 in the video signal processing circuit 19 are stored in the video memory unit 20 under the control of the memory controller 21. The digital composite video signals corresponding to the video signals read by the lower side reproduction pickup 17 are first output from the video memory unit 20 in their stored order under the control of the memory controller 21, and then converted by the D/A converter 22 into the analog composite video signals. The analog composite video signals from the D/A converter 22 are displayed on a screen, being separated into luminance and color signals.

After all the digital composite video signals corresponding to the video signals read by the lower side reproduction pickup 17 are displayed on the screen, the digital composite video signals corresponding to the video signals read by the upper side reproduction pickup 18 are output from the video memory unit 20 in an opposite order to their storage order under the control of the memory controller 21, and then converted by the D/A converter 22 into the analog composite video signals. The analog composite video signals from the D/A converter 22 are displayed on the screen, being separated into luminance and color signals.

Also, in the case where the video disk 14 is of the CLV type as shown in FIG. 5, it is rotated at a fixed linear velocity. As a result, each of the lower and upper sides of the video disk 14 of the CLV type has vertical synchronous signal regions V1–V5 and video signal regions H1–H4 which are alternately disposed at an interval of one rotation of the video disk 14.

In order to the video signals read on the upper side of the video disk 14, the upper side reproduction pickup 18 jumps two tracks to the outer circumference of the upper side of the video disk 14 every one rotation of the video disk 14 during the movement from the outer circumference to the inner circumference of the upper side of the video disk 14. The upper side reproduction pickup 18 waits at the jumped track until the vertical synchronous signal is read at the jumped track and then reads the video signals at the jumped track at that time that the vertical synchronous signal is read. For this reason, the video disk 14 of the CLV type is rotated faster than that of the CAV type to compensate for a time period required until the vertical synchronous signal is read at the jumped track.

The read video signals from the lower and upper side reproduction pickups 17 and 18 are applied to the video signal processing circuit 19. In the video signal processing circuit 19, the pre-amplifier 91 amplifies the read video signals from the lower and upper side reproduction pickups 17 and 18 by the predetermined level. The frequency-demodulator 92 frequency-demodulates the amplified video signals from the pre-amplifier 91 into the composite video signals. The A/D converter 93 converts the composite video signals from the frequency-demodulator 92 into the digital composite video signals in response to the predetermined clock from the system controller 11.

The digital composite video signals from the A/D converter 93 in the video signal processing circuit 19 are stored in the video memory unit 20 under the control of the memory controller 21. The digital composite video signals corresponding to the video signals read by the lower side reproduction pickup 17 are first output from the video memory unit 20 in their storage order under the control of the memory controller 21, and then converted by the D/A converter 22 into the analog composite video signals. The analog composite video signals from the D/A converter 22 are displayed on the screen, separated into luminance and color signals.

After all the digital composite video signals corresponding to the video signals read by the lower side reproduction pickup 17 are displayed on the screen, the digital composite video signals corresponding to the video signals read by the upper side reproduction pickup 18 are output from the video memory unit 20 in an opposite order from their storage order under the control of the memory controller 21, and then converted by the D/A converter 22 into the analog composite video signals. The analog composite video signals from the D/A converter 22 are displayed on the screen, separated into luminance and color signals.

As is apparent from the above description, according to the present invention, the lower side reproduction pickup reads the video signals recorded on the lower side of the video disk moving from the inner circumference to the outer circumference of the lower side of the video disk and the upper side reproduction pickup reads the video signals recorded on the upper side of the video disk moving from the outer circumference to the inner circumference of the upper side of the video disk. The read video signals from the lower and upper side reproduction pickups are stored in the video memory unit. The stored video signals from the upper side of the video disk are output to the screen in an opposite order from their storage order after the stored video signals from the lower side are output to the screen in their stored order. Therefore, the video signals from both the sides of the video disk can be successively reproduced with no discontinuity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of successively reproducing video signals from both sides of a video disk in a video disk player, comprising the steps of:
   (a) driving a spindle motor to rotate the video disk;
   (b) reading video signals recorded on a first side of the video disk by moving a first pickup element from an inner circumference to an outer circumference of the first side of the video disk and then reading video signals recorded on a second side of the video disk by moving a second pickup element from an outer circumference to an inner circumference of the second side of the video disk;
   (c) storing the video signals from the first side of the video disk and the video signals from the second side of the video disk, read in said step; and
   (d) outputting the video signals from the first side of the video disk in an order in which the video signals from the first side were stored in said step (c) and then outputting the video signals from the second side of the video disk in an opposite order from an order in which the video signals from the second side were stored in said step (c).

* * * * *